United States Patent Office 3,433,835
Patented Mar. 18, 1969

3,433,835
PROCESS FOR THE PREPARATION OF PHENOLS CONTAINING UNSATURATED GROUPS
Erwin Müller, Leverkusen, and Karl Dinges, Cologne-Stammheim, Germany, assignors to Farbenfabriken Bayer Aktiengesellschaft, Leverkusen, Germany, a corporation of Germany
No Drawing. Filed Nov. 24, 1965, Ser. No. 509,610
Claims priority, application Germany, Dec. 8, 1964, F 44,634
U.S. Cl. 260—562        9 Claims
Int. Cl. C07c 103/30

ABSTRACT OF THE DISCLOSURE

Phenol acrylamide or methacrylamides and a method for producing said compounds by reacting the corresponding acrylamide or methacrylamide alkyl cycloalkyl or aralkyl ether with a dialkyl-substituted phenol in the presence of an acid catalyst and polymerization inhibitor, effecting the reaction at 50–200° C.

---

This invention relates to novel phenols containing unsaturated groups, which can be used as stabilisers or antioxidants for synthetic plastics materials and synthetic rubber, and to a process for the preparation thereof.

The present invention provides phenols containing an unsaturated carboxylic acid amide group, said phenols being compounds of the general formula

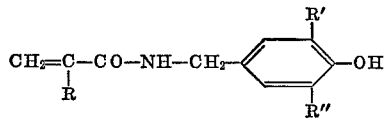

in which R represents a hydrogen atom or a methyl radical and R' and R'' each represent a lower alkyl group with up to 4 carbon atoms.

These new compounds can be obtained very easily and in good yields by reacting N-methylol ethers of the general formula

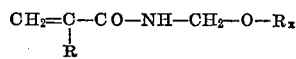

(in which R has the meaning indicated above and $R_x$ represents an alkyl radical, advantageously a saturated lower alkyl radical, a cycloalkyl radical or an aralkyl radical) advantageously in approximately equivalent quantities, with phenols of the general formula

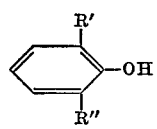

in which R' and R'' have the meaning indicated above.

The reaction is preferably carried out in the presence of catalytic quantities of acid catalysts, for example p-toluosulphonic acid, phosphoric acid, hydrochloric acid or sulphuric acid, the quantities used being between 0.005 and 1% by weight calculated on the total components introduced. The reaction proceeds at temperatures between 50 and 200° C., advantageously from 90 to 170° C., while distilling off the alcohol forming the basis of the methylol ether. The reaction can also be carried out in the presence of inert organic solvents, advantageously hydrocarbons and chlorinated hydrocarbons, such as chlorobenzene, dichlorobenzene, toluene, xylene or commercial benzine. In order to prevent premature polymerisation, it is advantageous to work in the presence of polymerisation inhibitors, such as phenthiazine, hydroquinone or copper oleate. These polymerisation inhibitors can be used in quantities from 0.01 to 1% by weight, based on the quantity of the polymerisable acid amide which is used.

The reaction thus takes place in accordance with the following equation:

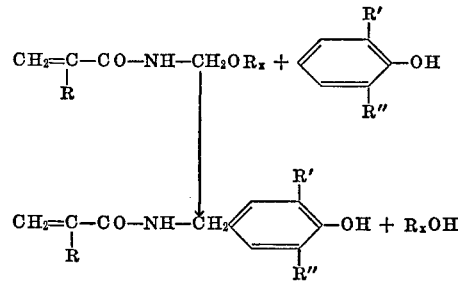

in which R, R', R'' and $R_x$ have the meanings indicated above.

The $\alpha,\beta$ unsaturated carbonamide-N-methylol ether preferably is an acrylamide or methacrylamide-N-methylol methyl ether. However, it is also possible to use the corresponding ethyl, propyl or butyl ethers.

The phenol reactant is a substituted 2,6-dialkyl phenol and 2,6-tert.-butyl phenol, 2,6-diisopropyl phenol and 2,6-diethyl phenol are mentioned as examples.

The products obtained by the present invention can be used as stabilisers and anti-oxidants for synthetic plastics materials and synthetic rubber. Accordingly, the present invention further provides a synthetic plastics material or synthetic rubber containing one or more of the novel phenols. It is generally sufficient if the novel phenols are added to the plastics material or rubber in quantities of 0.1 to 2.0% by weight, based on the solid polymer.

The following examples illustrate the invention:

Example 1a

A mixture of 206 g. of 2,6-di-tert.-butyl phenol (1 mol) and 129 g. of methacrylamide-N-methylol methyl ether (1 mol) were heated together while passing over $CO_2$ and after addition of 1 g. of p-toluosulphonic acid and 0.1 g. of phenthiazine in a spherical flask provided with a reflux condenser. Methanol started to be split off at 100 to 110° C. The temperature was gradually raised to 150 to 170° C. and the condensation was continued until 32 g. of methanol distilled off. The melt which was obtained solidified after standing for several days. M.P. from commercial benzine: 113° C. Yield: 225 g. of 2,6-ditertiarybutyl-4-methacryloylaminomethyl-phenol of the formula

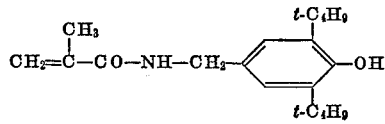

Example 1b 4880 g. of a 28.7% latex of a graft polymer of 36 parts of styrene and 14 parts of acrylonitrile on 50 parts of polybutadiene wer mixed with 6000 g. of 43.4% latex of a copolymer of 70 parts of styrene and 30 parts of acrylonitrile with a K-value of 60.3 (see in this connection Fikentscher Cellulosechemie 13 (1932) p. 58) and an intrinsic viscosity of 0.71 to 0.80. The ratio between graft polymer and resin was then 35.65. 100 g. of a 20% aqueous emulsion of the product obtained according to Example 1a were thereafter incorporated by stirring into this latex mixture. Based on the total polymer, this mixture accordingly contained 0.5% by weight of the reaction product according to the invention. The polymer mixture stabilized in this manner is coagulated with the aid of a 2% acetic acid, the coagulate is separated out, washed until neutral and dried at 70 to 80° C. in vacuo. 2% by weight of a normal commercial lubricant were added to 100 g. of the dried and stabilised polymer mixture and the mixture was rolled at 160° C. on a two-roll stand. After formation of the sheet, a third of the total sample was taken in each case at intervals of 5, 10 and 20 minutes. The separate sheets were granulated and the granulated material was injection moulded on a single-worm injection moulding machine to form sample plates. The sample plates were judged visually, by taking into account both the background brightness and also the stability over the entire rolling time thermostability. The evaluation was effected according to the following valuation levels:

TABLE 1

| Valuation: | Quality |
|---|---|
| Very good | 1 |
| Good | 2 |
| Still suitable | 3 |
| Of unsuitable colour | 4 |

The polymer mixture stabilized with the reaction product according to the invention reached the quality 1.

Example 2a

|  | G. |
|---|---|
| 2,6-diethylphenol (1 mol) | 150.0 |
| Methacrylamide-N-methylol methyl ether (1 mol) | 120.0 |
| p-Toluosulphonic acid | 1.0 |
| Phenthiazine | 0.1 | were reacted together under the condition of Example 1a. 31 g. of methanol were split off and 220 g. of 2,6-diethyl-4-methacryloyl aminomethyl-phenol were obtained. M.P. from ethyl acetate: 118° C.

Example 2b

By analogy with Example 1b, a latex mixture was prepared which, based on solid polymer, contained 35 parts by weight of the graft polymer described and 65 parts by weight of the styrene-acrylonitrile resin described. 100 g. of a 20% aqueous emulsion of the reaction product prepared according to Example 2a from 1 mol of 2,6-diethyl phenol and 1 mol of methacrylamide-N-methylol methyl ether were thereafter incorporated by stirring into the said latex mixture. Based on the total polymer, this mixture consequently contained 0.5% by weight of the reaction product of Example 2a. The working up and further processing of the moulding composition stabilised in this way was carried out in the same manner as indicated in Example 1b. The thermostability valuation for sample plates corresponded to quality 1.

Example 3a

|  | G. |
|---|---|
| 2,6-diethyl phenol (1 mol) | 150.0 |
| Acrylamide-N-methylol methyl ether (1 mol) | 115.0 |
| p-Toluosulphonic acid | 1.0 |
| Phenthiazine | 0.1 | were reacted under the conditions of Example 1a at temperatures from 105 to 170° C. 28 g. of methanol were split off.

M.P. from ethyl acetate: 137° C. Yield: 130 g. of 2,6-diethyl-4-acryloylaminomethyl-phenol of the formula

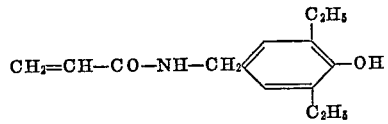

Example 3b

In a manner analogous to Example 1b, 4880 g. of a 28.7% latex of a graft polymer of 36 parts of styrene and 14 parts of acrylonitrile on 50 parts of polybutadiene were mixed with 6000 g. of a 43.4% latex of a copolymer of 70 parts of styrene and 30 parts of acrylonitrile with a K-value of 60.3 and an intrinsic viscosity of 0.71 to 0.80. The ratio between graft polymer and resin component was then once again 35:65. 100 g. of a 20% aqueous emulsion of the reaction product prepared according to Example 3a were thereafter incorporated by stirring into this latex mixture. Based on the total polymer, the mixture contained 0.5% by weight of the said reaction product. The working up and further processing of the polymer mixture stabilised in this way was affected in the same manner as indicated in Example 1b. The thermostability valuation stage determined with the same plates corresponded to quality 1.

Example 3c (For comparison purposes)

If 0.5% by weight of 4,4'-methylene-bis-2,6-diethylphenol were used instead of the stabiliser described in Example 3b, and after working up and drying of the powder such a strong discoloration thermostability was observed that it is no longer possible to carry out a further processing and testing.

Example 4

|  | G. |
|---|---|
| 2,6-diisopropyl phenol (1 mol) | 178.0 |
| Methacrylamide-N-methylol methyl ether (1 mol) | 129.0 |
| p-Toluosulphonic acid | 1.0 |
| Phenthiazine | 0.1 | were reacted under the conditions described in Example 1a. The condensation temperature was 100 to 130° C. and 28 g. of methanol were split off.

Yellow viscous oil. Yield: 250 g. of 2,6-diisopropyl-4-methacryloylaminomethyl-phenol.

Example 5

A solution of 206 g. of 2,6-di-tert.-butyl phenol (1 mol) in 200 cc. of o-dichlorobenzene and 129 g. of methacrylamide-N-methylol methyl ether (1 mol) was heated in a spherical flask provided with a reflux condenser while passing over $CO_2$ and after adding 1 g. of p-toluosulphonic acid. Methanol started to be split off at 100 to 110° C. The temperature gradually rose up to the boiling point of the o-dichlorobenzene, the solvent was then distilled off in vacuo and the residue was recrystallised from commercial benzine. M.P.: 113° C. Yield: 222 g.

What we claim is:
1. A compound of the formula

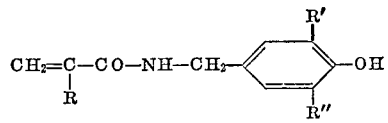

in which R is a member selected from the group consisting of hydrogen and methyl and R' and R'' are alkyl radicals of 1-4 carbon atoms.

2. 2,6 - ditertiarybutyl - 4 - methacryloylaminomethylphenol.
3. 2,6-diethyl-4-acryloylamino-methyl-phenol.
4. 2,6-diethyl-4-methacryloyl aminomethyl-phenol.
5. 2,6-diisopropyl-4-methacryloyl aminomethyl-phenol.
6. A process for the preparation of the compound of claim 1, which comprises contacting a methylol ether of the formula

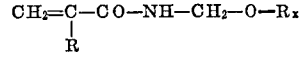

in which R is a member selected from the group consisting of a hydrogen and methyl; $R_x$ is a member selected from the group consisting of an alkyl, cycloalkyl and aralkyl; with a phenol of the formula

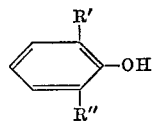

in which R' and R" are alkyl radicals of 1–4 carbon atoms, effecting the reaction at a temperature of 50° C.–200° C. in the presence of a catalytic amount of a member selected from the group consisting of p-toluosulphonic acid, phosphoric acid, hydrochloric acid and sulfuric acid; and a polymerization-inhibiting amount of a polymerization inhibitor.

7. A process for the preparation of the compound of claim 1, which comprises contacting a methylol ether of the formula

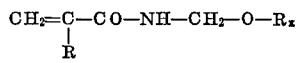

in which
R is a member selected from the group consisting of a hydrogen and methyl;
$R_x$ is a member selected from the group consisting of an alkyl cycloalkyl and aralkyl;
with a phenol of the formula

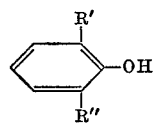

in which R' and R" are alkyl radicals of 1–4 carbon atoms, effecting the reaction at a temperature of 50° C.–200° C. in the presence of a catalytic amount of a member selected from the group consisting of p-toluosulphonic acid, phosphoric acid, hydrochloric acid and sulfuric acid; and a polymerization-inhibiting amount of a compound selected from the group consisting of phenthiazine, hydroquinone and copper oleate.

8. The process of claim 7 wherein p-toluosulfonic acid is utilized in active catalytic amounts.

9. The process of claim 7 wherein phenthiazine is utilized in polymerization-inhibiting amount during the reaction.

References Cited

UNITED STATES PATENTS 3,280,189  10/1966  Cline et al. _____ 260—562
3,062,882  11/1962  Parris _____ 260—562

HENRY R. JILES, *Primary Examiner.*

HARRY I. MOATZ, *Assistant Examiner.*

U.S. Cl. X.R.

260—561, 45.9, 880, 883